United States Patent [19]

Kucherov et al.

[11] Patent Number: 5,168,536
[45] Date of Patent: Dec. 1, 1992

[54] HIGH POWER TRANSMISSION OPTICAL FIBER TERMINUS

[75] Inventors: Yakov Kucherov, Sherman Oaks; Mehrdad Ghara, Santa Monica, both of Calif.

[73] Assignee: G & H Technology, Inc., Camarillo, Calif.

[21] Appl. No.: 568,766

[22] Filed: Aug. 17, 1990

[51] Int. Cl.⁵ .......................... G02B 6/36; G02B 7/26
[52] U.S. Cl. .................................................. 385/78
[58] Field of Search .......................... 350/96.20, 96.21

[56] References Cited

U.S. PATENT DOCUMENTS 4,747,658  5/1988  Borsuk et al. ................ 350/96.21

Primary Examiner—William L. Sikes
Assistant Examiner—Robert E. Wise
Attorney, Agent, or Firm—George J. Netter

[57] ABSTRACT

An optical fiber connector part (20) has an outer metal sleeve (22) for sliding receipt within an alignment tube (24) and a spacer (26) constructed of a synthetic plastic wedged within the sleeve (22). An opening (28) within the spacer (26) receives a bare fiber end portion (30).

5 Claims, 1 Drawing Sheet

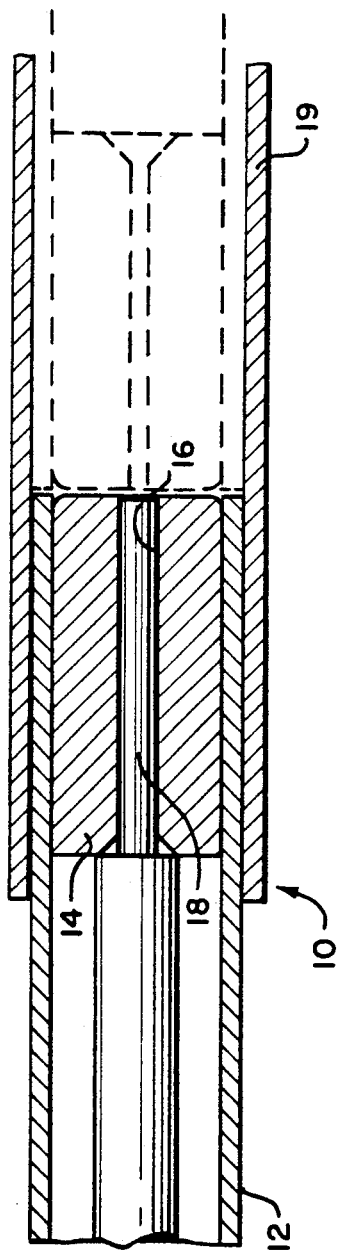
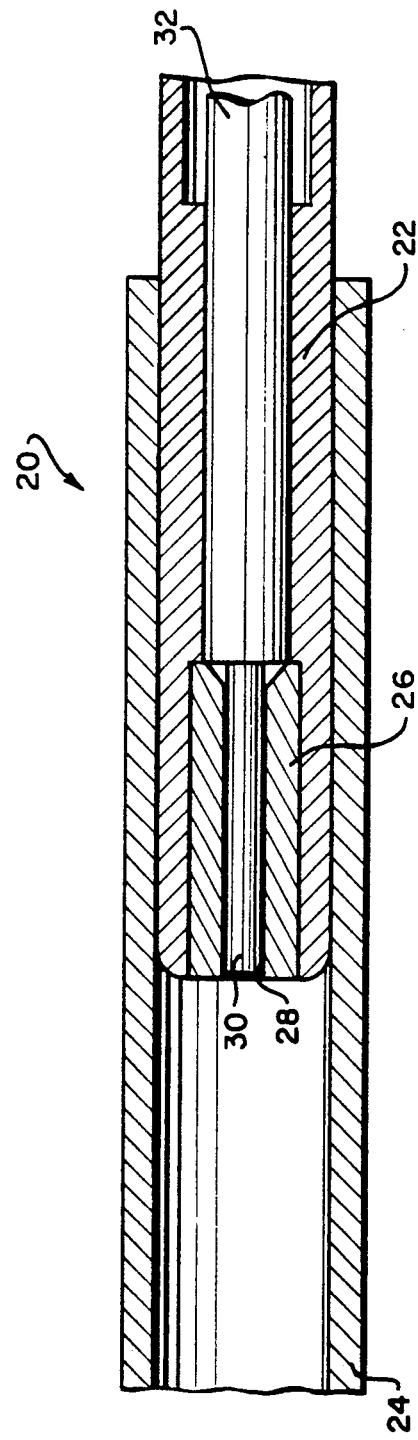

HIGH POWER TRANSMISSION OPTICAL FIBER TERMINUS

BACKGROUND OF THE INVENTION

1. Field of the Invention

The present invention relates generally to optical fiber connectors or termini, and, more particularly, to an optical fiber terminus which can transmit relatively high power optical energy without being damaged.

2. Description of Related Art

An optical fiber connector or terminus is a device for locating the ends of two fibers that have had their respective ends faced off at 90 degrees to their longitudinal axis and are precisely aligned in order to enable the efficient transfer of light energy across the junction. Specifically, a well known present day terminus includes a ceramic or metal ferrule having an appropriately dimensioned opening in which one of the fibers is located, with a pair of the ferrules being received within an alignment cylinder for holding the fiber ends in proper end spaced relationship. In a certain other known terminus, the ends of the fibers are coupled via one or more lenses.

Where relatively high energy optical signals (e.g., 0.5 Joules) are used there is a tendency for the fiber and adjacent terminus parts, such as the ferrule, for example, to become discolored and physically damaged from the conversion of the light being transmitted along the fiber into heat. In explanation, an optical fiber typically includes an outer buffer coating that protects the core and cladding against contact damage. When the fiber has an end portion assembled into a known present day terminus ferrule, it first has the buffer coating removed from the end portion. Accordingly, when a light signal of a energy level equalling about 0.5 Joules or higher passes through the terminus junction a part of the light energy is absorbed by the ferrule and converted to heat, which has been found sufficient to damage the terminus.

In the past these ferrules have been made of either stainless steel or ceramic, the two materials which were the only materials known to possess the desired properties of good heat tolerance as well as being able to be made in precisely dimensional configurations required and manufacturable for a relatively reasonable cost. When the power of light signals being transmitted along the fiber, and across connector junctions, increased to the power levels indicated it has become necessary to seek alternative constructions that can withstand high power transmissions.

SUMMARY OF THE INVENTION

In accordance with the present invention, a cylindrical ferrule for use in an optical fiber terminus includes a metal sleeve within which is wedged a spacer constructed of a synthetic plastic material which is fully polymerized and has both substantial thermal diffusivity and good light absorbance characteristics for wavelengths in the order of 1.06 $\mu$M. An axial opening in the spacer receives the fiber therein for locating the highly polished fiber end very closely adjacent the spacer outer end face. When high power light passes along the fiber the spacer material instead of absorbing light energy into just a narrow layer of the spacer adjacent the fiber junction it rapidly diffuses the heat energy formed throughout the spacer and into the ferrule sleeve reducing the maximum temperature achieved by any of the ferrule parts. One material found satisfactory for constructing such a spacer is sold under the trade designation DELRIN by E. I. duPont de Nemours Co., Inc.

As a preferred method of practicing the invention, a solid spacer cylinder of a selected synthetic plastic of appropriate outer diameter is fittingly received within the sleeve. An opening for snugly receiving the bare glass end portion of an optical fiber is formed along the cylinder longitudinal axis. Next, the faced off, polished fiber with an end portion of buffer coating removed is positioned within the opening. Finally, a pair of fibers mounted in separate connector parts as described are received within opposite ends of an aligment tube to properly locate the fiber end faces for light signal transmission.

BRIEF DESCRIPTION OF THE DRAWING

In the accompanying drawings:

FIG. 1 is a side elevational sectional view of a prior art terminus; and

FIG. 2 is a perspective partially sectional view of the invention.

DESCRIPTION OF A PREFERRED EMBODIMENT

Turning now to the drawing and particularly FIG. 1 there is shown a prior art terminus 10. Specifically, the terminus includes an outer sleeve 12 within which a metal ferrule 14 is slidingly received. The ferrule has an opening 16 precisely located on the ferrule longitudinal axis (thus coinciding with the sleeve 12 axis), such that an optical fiber 18 with buffer coating removed can be positioned therein. It is a conventional requirement that the fiber located within the ferrule opening have its end faced off at precisely 90 degrees to the fiber axis and be highly polished.

In use, two such connector parts are mounted in opposite ends of a cylindrical alignment tube 19 positioning the end faces of the fibers very closely together and precisely aligned, both of which are requisite for transmitting light energy across the junction in an efficient manner. Also, certain connectors utilize one or more optical lenses (not shown) between the two fiber ends.

Keeping in mind the very small dimensions concerned here (e.g., an optical fiber is measured in thousandths of an inch in cross-section) when relatively high optical energy, i.e. 0.5 Joules or more, is transmitted along the fiber, a substantial amount of light energy will impinge upon the ferrule 14 in the region where the buffer coating has been removed as well as from leakage in the space between. This light energy is converted to heat and has been found to quickly produce discoloration and eventual destruction of a metal ferrule. In the case of a steel ferrule, what occurs is that the light energy is absorbed into a relatively thin layer of the metal rather than being distributed throughout a substantial volume which results in a destructively high temperature being produced in the metal layer.

A satisfactory ferrule material must also be capable of being machined to precise dimensions and be dimensionally stable to a high degree over a wide temperature range. Stainless steel has been a standard material used for this purpose, and although having the desired characteristics of dimensional stability and machinability, its heat characteristics are not fully satisfactory for high-level energy transfer along the enclosed fiber. As has already been alluded to, a ferrule made of stainless steel when used in a terminus transmitting power in the range of 0.5 Joules quickly develops discoloration and eventual deterioration. This situation is not substantially improved by increasing the ferrule mass (e.g., thickening the ferrule wall) since the diffusivity of heat generated in the ferrule metal is not sufficient to maintain the temperature immediately adjacent the fiber within acceptably low limits.

Ferrules made out of several different ceramics have good dimensional stability and can be made into precisely dimensioned configurations. However, when exposed to the levels of light energy referenced (0.5 joules or higher) small spots of carbonization appear which then absorb more radiation, and so on until the ferrule is irretrievably damaged.

Turning now to FIG. 2, a connector part 20 is shown constructed in accordance with the present invention. The metal sleeve 22 and alignment tube 24 can be identical to the corresponding parts depicted in the prior art connector part of FIG. 1. The essential difference is in the spacer 26 which is constructed of a synthetic plastic that is fully polymerized and possesses an excellent diffusivity for light energy of a wavelength of about 1.06 $\mu M$. Various other synthetic plastic materials having known high heat tolerance characteristics may be satisfactory for present purposes, however, best results to date have been achieved using a plastic sold under the trade designation DELRIN by E. I. duPont de Nemours Co., Inc. The superior results actually achieved result from the synthetic plastic absorbing the radiation more deeply into the spacer body thereby reducing severe local temperature increases in the spacer and in the metal sleeve.

A preferred advantageous method of making a ferrule 26 for incorporation into a connector part 20 includes forming a block of the synthetic plastic material into a solid cylinder of outer diameter enabling close fitting receipt (actually wedged) within the sleeve 22. Then, an opening 28 is formed in the solid cylinder extending precisely along the cylindrical axis and of a diameter enabling sliding receipt of the bare glass end 30 of a fiber 32 therein.

Although the invention has been described in connection with a preferred embodiment, it is to be understood that one skilled in the appertaining art may make modifications that come within the spirit of the invention as described and within the ambit of the appended claims.

What is claimed is:

1. An optical fiber connector part for use in a terminus where two such connector parts are received in opposite ends of an alignment tube, comprising:
   a metal cylindrical sleeve of external dimensions enabling sliding receipt within the alignment tube and having an internal bore; and
   a cylindrical spacer having external dimensions enabling fitting receipt within the sleeve bore and having an opening extending completely along the spacer cylindrical axis for receiving an optical fiber therein, said spacer being constructed of a synthetic plastic that is completely polymerized.

2. An optical fiber connector part as in claim 1, in which the synthetic plastic material has such thermal absorbance and diffusivity properties as to absorb and distribute heat energy from the optical fiber carried within the spacer opening.

3. An optical fiber connector as in claim 2, in which the light energy passing along the optical fiber is above about 0.5 joules.

4. An optical fiber connector as in claim 1, in which the synthetic plastic is a material sold under the trade designation DELRIN.

5. An optical fiber connector as in claim 1, in which an internal shoulder is located within the bore against which the spacer abuts.

* * * * *